United States Patent
Kulkarni et al.

(10) Patent No.: US 6,414,966 B1
(45) Date of Patent: Jul. 2, 2002

(54) BRIDGING DEVICE FOR MAPPING/DEMAPPING ETHERNET PACKET DATA DIRECTLY ONTO AND FROM A SONET NETWORK

(75) Inventors: Milind M Kulkarni, Shelton, CT (US); Mahabala Shetty, Mumbai (IN); Suresh K. Pillai, Stratford, CT (US)

(73) Assignee: OSS Corporation, Shelton, CT (US)

( * ) Notice: Subject to any disclaimer, the term of this patent is extended or adjusted under 35 U.S.C. 154(b) by 0 days.

(21) Appl. No.: 09/594,937

(22) Filed: Jun. 15, 2000

(51) Int. Cl.[7] .............................. H04J 3/22; G06F 15/16
(52) U.S. Cl. ........................ 370/465; 709/250; 370/545
(58) Field of Search ................................ 370/465–466, 370/468, 470, 472, 476, 545, 907, 910, 914; 709/236, 250

(56) References Cited

U.S. PATENT DOCUMENTS 5,896,383 A * 4/1999 Wakeland .................... 370/466
6,014,708 A * 1/2000 Klish .......................... 370/465

FOREIGN PATENT DOCUMENTS

EP          1 006 751 A2 *   6/2000

* cited by examiner

*Primary Examiner*—Wellington Chin
*Assistant Examiner*—Maikhanh Tran

(74) *Attorney, Agent, or Firm*—David P Gordon; David S Jacobson; Thomas A Gallagher (57) ABSTRACT

A bridging device for mapping and demapping Ethernet data packets onto a SONET network includes an Ethernet controller chip set which receives packet data, a SONET framer for a SONET interface, a UTOPIA interface for the SONET framer, and an FPGA (or ASIC) which bridges the UTOPIA interface and a system bus interface of the Ethernet controller. The FPGA is preferably implemented in VHDL software code as several modules: an Ethernet controller interface module, a chunk memory module, a UTOPIA interface module, a microprocessor interface module, and a UTOPIA OUT module. In a transmit mode, the Ethernet controller interface module interfaces with the data and control signals from a thirty-two bit data bus of the Ethernet controller chip set and writes the data to chunk memory implemented in the FPGA. The chunk memory module implements the chunk memory to a programmable size. The UTOPIA interface module implements an interface with data and control bus signals of Fr-UTOPIA and reads data sixteen bits at a time from chunk memory and writes the data to the Fr-UTOPIA interface bus. The microprocessor interface module implements the control and status registers. The UTOPIA OUT module implements address and data bus drivers and control signals of the Fr-UTOPIA data bus. A top level module instantiates the modules with proper signals. The bridging device is also adapted for a receive mode in which an FPGA operates substantially in reverse.

20 Claims, 12 Drawing Sheets

Microfiche Appendix Included
(1 Microfiche, 53 Pages)

FIG.1A

| PIN NAME | I/O | DESCRIPTION |
|---|---|---|
| RXTX_DATA [0..31] | BI | RX/TX SYSTEM INTERFACE DATA BUS. SHARED DATA BUS THAT INTERFACES THE 84302. USED TO TRANSFER TX/RX DATA |
| RXTX_BE0 | I | RX/TX BYTE ENABLE 0. INDICATES BIT 0-7 ARE VALID ON RXTX_DATA |
| RXTX_BE1 | I | RX/TX BYTE ENABLE 1. INDICATES BIT 8-15 ARE VALID ON RXTX_DATA |
| RXTX_BE2 | I | RX/TX BYTE ENABLE 2. INDICATES BIT 16-23 ARE VALID ON RXTX_DATA |
| RXTX_BE3 | I | RX/TX BYTE ENABLE 3. INDICATES BIT 24-31 ARE VALID ON RXTX_DATA |
| RXRDY[0..3] | I | RX FIFO READY. PROGRAMMABLE THRESHOLD THAT INDICATES THE 84302'S RX FIFO HAS DATA TO BE READ OR THAT AN END OF A PACKET HS BEEN LOADED INTO THE FIFO |
| RXOVF[0..3] | I | RX FIFO OVERFLOW. INDICATES THE 84302'S RX FIFO IS FULL |
| RXDC[0..3] | I | RX FIFO DATA DISCARD. INDICATES A RECEIVE ERROR OCCURED AND THE FRAME SHOULD BE DISCARDED. NO NEW DATA WILL BE ALLOWED INTO THE FIFO UNTIL THE NEXT FRAME |
| RXABORT[0..3] | O | RX ABORT. INDICATES A FRAME HAS BEEN ABORTED |
| RXINTEN# | O | RX INTERFACE ENABLE. ENABLES THE RX INTERFACE ON THE 84302 |
| RXRDEN# | O | RX INTERFACE ENABLE. DATA IS CLOCKED OUT OF THE 84302'S RX FIFO ON THE RISING EDGE OF THE CLOCK WHEN THIS SIGNAL IS LOW AND RXINTEN# IS LOW |
| RXPS[0..1] | TRI | RX PORT SELECT. SELECTS ONE OF FOUR PORTS ON THE 84302 |
| RXTXEOF | BI | RX/TX END OF FRAME. FOR TX FPGA THIS PIN IS INPUT, INDICATING WHEN LAST WORD OF A RECIEVE PACKET IS BEING READ OUT FROM FIFO |
| CLRRXERR | I | CLEAR RECIEVE ERROR I/P. INDICATES RXDC PIN FOR SELECTED PORT IS CLEARED LOW |
| SPDTAVL | O | FIFO SPACE/DATA AVAILABLE O/P. IT INDICATES WHEN MORE THAN 1 DOUBLE WORD OF DATA IS IN RX FIFO |

FIG.2

| PIN NAME | I/O | DESCRIPTION |
|---|---|---|
| TXUCLK | I | TRANSMIT UTOPIA CLOCK. TRANSMIT Fr-Utopia INTERFACE CLOCK INPUT. ALL SIGNALS ARE SYNCHRONOUS TO THIS CLOCK |
| TXUDATA[0..15] | O | TRANSMIT UTOPIA DATA BUS. 16-bit DATA PATH. BIT 15 IS THE MSB |
| TXUADDR[0..4] | O | TRANSMIT UTOPIA ADDRESS BUS. 5-bit PHYSICAL DEVICE ADDRESS. USED TO SELECT A PARTICULAR PHY |
| TXPRTY | O | TRANSMIT PARITY. ODD PARITY CALCULATED OVER 16-bits |
| TXSOC | O | TRANSMIT START OF CELL OR START OF CHUNK IN PPP MODE |
| TXNENB# | O | TRANSMIT ENABLE. DATA IS VALID WHEN THIS SIGNAL IS ASSERTED |
| TXCLAV[0..3] | I | TRANSMIT CELL AVAILABLE. THIS SIGNAL INDICATES THAT THE TX-FPGA MAY TRANSMIT A CHUNK |
|  |  |  |
| TXSOFI | O | TRANSMIT START OF FRAME. INDICATES THE CURRENT 16-bit WORD IS THE FIRST WORD OF A FRAME |
| TXEOFI | O | TRANSMIT END OF FRAME. INDICATES THE CURRENT 16-bit WORD IS THE LAST WORD OF A FRAME |
| TXMSI | O | TRANSMIT MOST SIGNIFICANT BYTE. INDICATES THE LAST WORD OF THE PACKET FRAME ENDS ON THE MOST SIGNIFICANT BYTE OF THE CURRENT WORD TRANSFER |
| TXABTO | I | TRANSMIT PACKET ABORT. THIS SIGNAL IS DRIVEN BY THE SMART CHIP IN THE EVENT OF A PACKET ERROR THAT RESULTS IN AN ABORT |

FIG.3

| PIN NAME | I/O | DESCRIPTION |
|---|---|---|
| MD[0..7] | BI | MICROPROCESSOR DATA BUS. EIGHT LSBs OF THE LOCAL MICROPROCESSOR'S DATA BUS |
| MADDR[0..3] | I | MICROPROCESSOR ADDRESS BUS. FOUR LSBs OF THE LOCAL MICROPROCESSOR'S ADDRESS BUS |
| TXFPGA_CS# | I | TX-FPGA CHIP SELECT. ACTIVE LOW SIGNAL USED TO SELECT THE DEVICE |
| MWR# | I | MICROPROCESSOR WRITE. ACTIVE LOW SIGNAL THAT INDICATES A WRITE CYCLE IS TO BE PERFORMED |
| MRD# | I | MICROPROCESSOR READ. ACTIVE LOW SIGNAL THAT INDICATES A READ CYCLE IS TO BE PERFORMED |
| TXFPGA_DTACK | TRI | TX-FPGA DATA TRANSFER ACKNOWLEDGE. THIS SIGNAL INDICATES READ DATA IS VALID OR WRITE DATA HAS BEEN WRITTEN TO THE MICROPROCESSOR |
| RST# | I | SYSTEM RESET |
| MSCLK | I | MICROPROCESSOR SYSTEM CLOCK. CLOCK SYNCHRONOUS TO THE LOCAL MICROPROCESSOR'S CLOCK |

FIG.4

| PIN NAME | I/O | DESCRIPTION |
|---|---|---|
| RXTX_BUSREQ# | O | RX/TX DATA BUS REQUEST. INDICATES THE TX-FPGA REQUIRES USE OF THE SHARED RXTX DATA BUS. THE RX-FPGA ACTS AS THE ARBITER |
| RXTX_BG# | I | RX/TX BUS GRANT. INDICATES THE BUS THE RXTX DATA BUS HAS BEEN GRANTED TO THE TX-FPGA |

| FIG.7A |
|--------|
| FIG.7B |

BRIDGING DEVICE FOR MAPPING/DEMAPPING ETHERNET PACKET DATA DIRECTLY ONTO AND FROM A SONET NETWORK

BACKGROUND OF THE INVENTION

1. Field of the Invention

This invention relates broadly to telecommunications. More particularly, this invention relates to mappers/demappers for the transmission of data streams across different protocols.

2. State of the Art

Ethernet is a widely implemented local area network (LAN) and metropolitan area network (MAN) transmission standard. Ethernet is an asynchronous variable length packet based system. SONET, which stands for Synchronous Optical Network, is a set of ANSI telecommunications standards which specify a modular family of rates and formats for synchronous optical networks. SONET provides a plesiochronous standard operating environment for managing high bandwidth services, and incorporates multiplexing, service mapping, and standardized interfaces. ATM, which stands for Asynchronous Transfer Mode, is defined by a set of ATM forum recommendations which specify mechanisms for transporting data in cells of a predetermined number of bytes.

Currently, when it is necessary to move data from an Ethernet protocol environment to a SONET network, the Ethernet data is converted into ATM standard format which is then modified to meet SONET standard format, as ATM shares some commonalities with each of Ethernet and SONET. However, this is inefficient as it results in additional overhead and additional complexity. There is no known solution for mapping and demapping Ethernet packet traffic directly onto and from a SONET network.

SUMMARY OF THE INVENTION

It is therefore an object of the invention to provide a device which maps/demaps Ethernet traffic directly onto and from a SONET network.

It is another object of the invention to provide a device which can be implemented on a field programmable gate array (FPGA) or an application specific integrated circuit (ASIC) to directly map/demap Ethernet packets to SONET data and SONET data to Ethernet packets.

It is a further object of the invention to provide a device which is modular and can be implemented in an FPGA or ASIC.

In accord with these objects, which will be discussed in detail below, a bridging device for mapping Ethernet data packets directly onto a SONET network and demapping SONET data into Ethernet data packets is provided. The bridging device includes an Ethernet controller (chip set) which receives packet data, a SONET framer for a SONET interface, a Utopia Level 2P (Fr-UTOPIA) interface for the SONET framer and an FPGA (or ASIC) which bridges the Fr-UTOPIA interface and a system bus interface of the Ethernet controller.

The FPGA is preferably implemented in VHDL software code as several modules: an Ethernet controller interface module, a chunk memory implementation module, a UTOPIA interface module, a microprocessor interface module, and an Fr-UTOPIA OUT module. The Ethernet controller interface module interfaces with the data and control signals from a thirty-two bit data bus of the Ethernet controller and writes the data to chunk memory implemented in the FPGA. The chunk memory implementation module implements the chunk memory to a programmable size of 32, 48 or 64 bytes, which supports point-to-point protocol (PPP) for mapping internet protocol (IP) data, and includes a memory address generator to read and write the memory. The UTOPIA interface module implements an interface with data and control bus signals of Fr-UTOPIA and reads data sixteen bits at a time from chunk memory and writes the data to the Fr-UTOPIA interface bus. The microprocessor interface module implements the control and status registers. The Fr-UTOPIA OUT module implements address and data bus drivers and control signals of the Fr-UTOPIA data bus. A top level module defines all external pins, signals used internally, and the above five modules, and instantiates the modules with proper interconnecting signals.

The bridging device of the invention permits Ethernet data packets to be directly mapped onto a SONET network and SONET network data to be demapped into Ethernet packets.

Additional objects and advantages of the invention will become apparent to those skilled in the art upon reference to the detailed description taken in conjunction with the provided figures.

BRIEF DESCRIPTION OF THE DRAWINGS

FIG. 2 is a table defining the transmit signalling/pin assignments of the pins of the Ethernet state machine of the FPGA of the invention;

BRIEF DESCRIPTION OF THE APPENDICES

Microfiche Appendix 1 is VHDL software code for the Ethernet controller interface module, in mapping or transmit mode, for the FPGA of the bridging device;

Microfiche Appendix 2 is VHDL software code for the chunk memory module, in transmit mode, for the FPGA of the bridging device;

Microfiche Appendix 3 is VHDL software code for the Fr-UTOPIA interface module, in transmit mode, for the FPGA of the bridging device;

Microfiche Appendix 4 is VHDL software code for the microprocessor interface module, in transmit mode, for the FPGA of the bridging device;

Microfiche Appendix 5 is VHDL software code for the Fr-UTOPIA OUT, module, in transmit mode, for the FPGA of the bridging device;

Microfiche Appendix 6 is VHDL software code for the top level design, in transmit mode, for the FPGA of the bridging device;

Microfiche Appendix 7 is VHDL software code for the Ethernet controller interface module, in demapping or receive mode, for the FPGA of the bridging device;

Microfiche Appendix 8 is VHDL software code for the chunk memory module, in receive mode, for the FPGA of the bridging device;

Microfiche Appendix 9 is VHDL software code for the Fr-UTOPIA interface module, in receive mode, for the FPGA of the bridging device;

Microfiche Appendix 10 is VHDL software code for the microprocessor interface module, in receive mode, for the FPGA of the bridging device; and Microfiche Appendix 11 is VHDL software code for the top level design, in receive mode, for the FPGA of the bridging device.

DETAILED DESCRIPTION OF THE PREFERRED EMBODIMENTS

Figures 1, 1B:
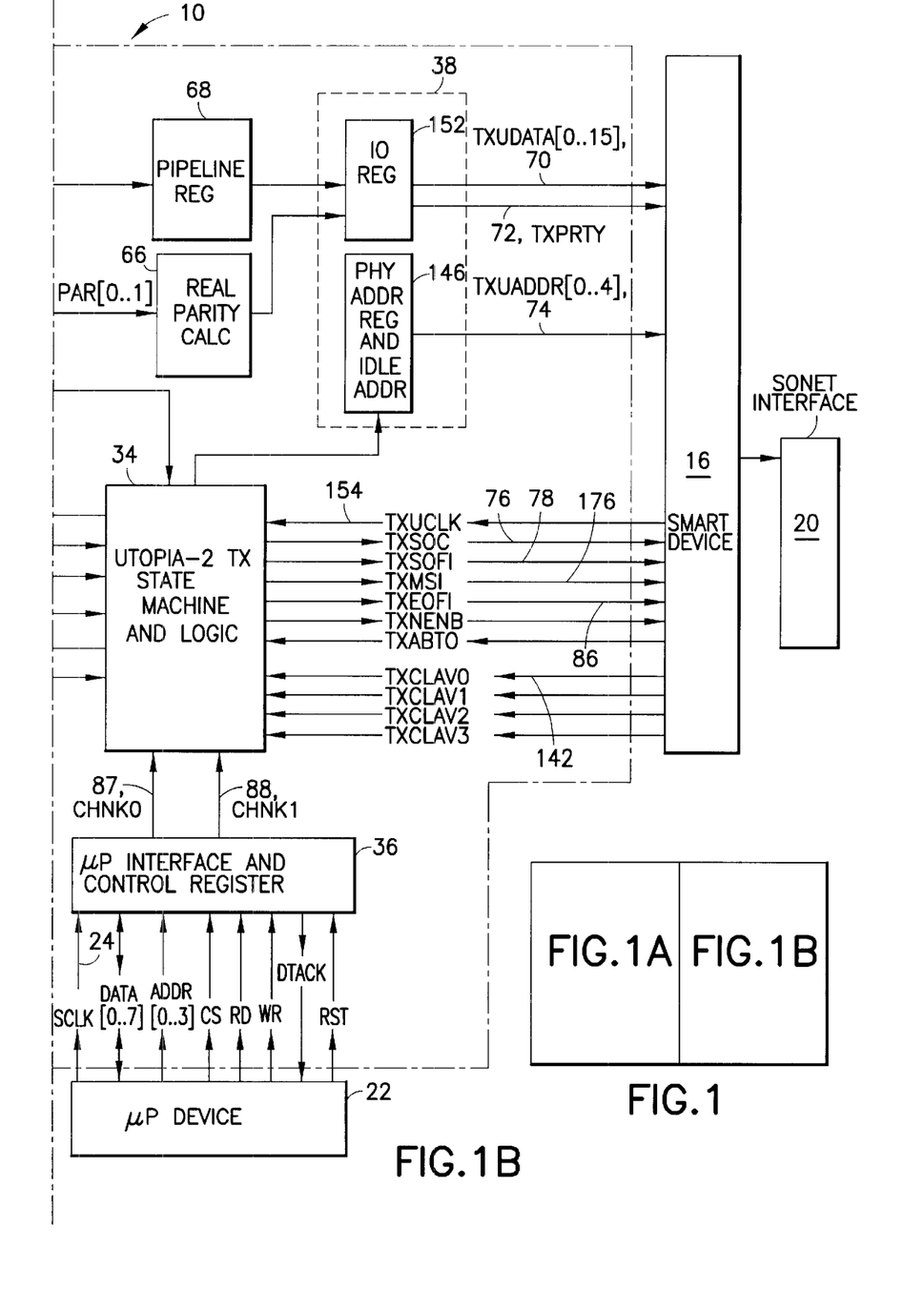
FIG. 1 is a high level block diagram of the transmit side (Ethernet packet data to SONET network) of the bridging device of the invention.
Figure 1A:
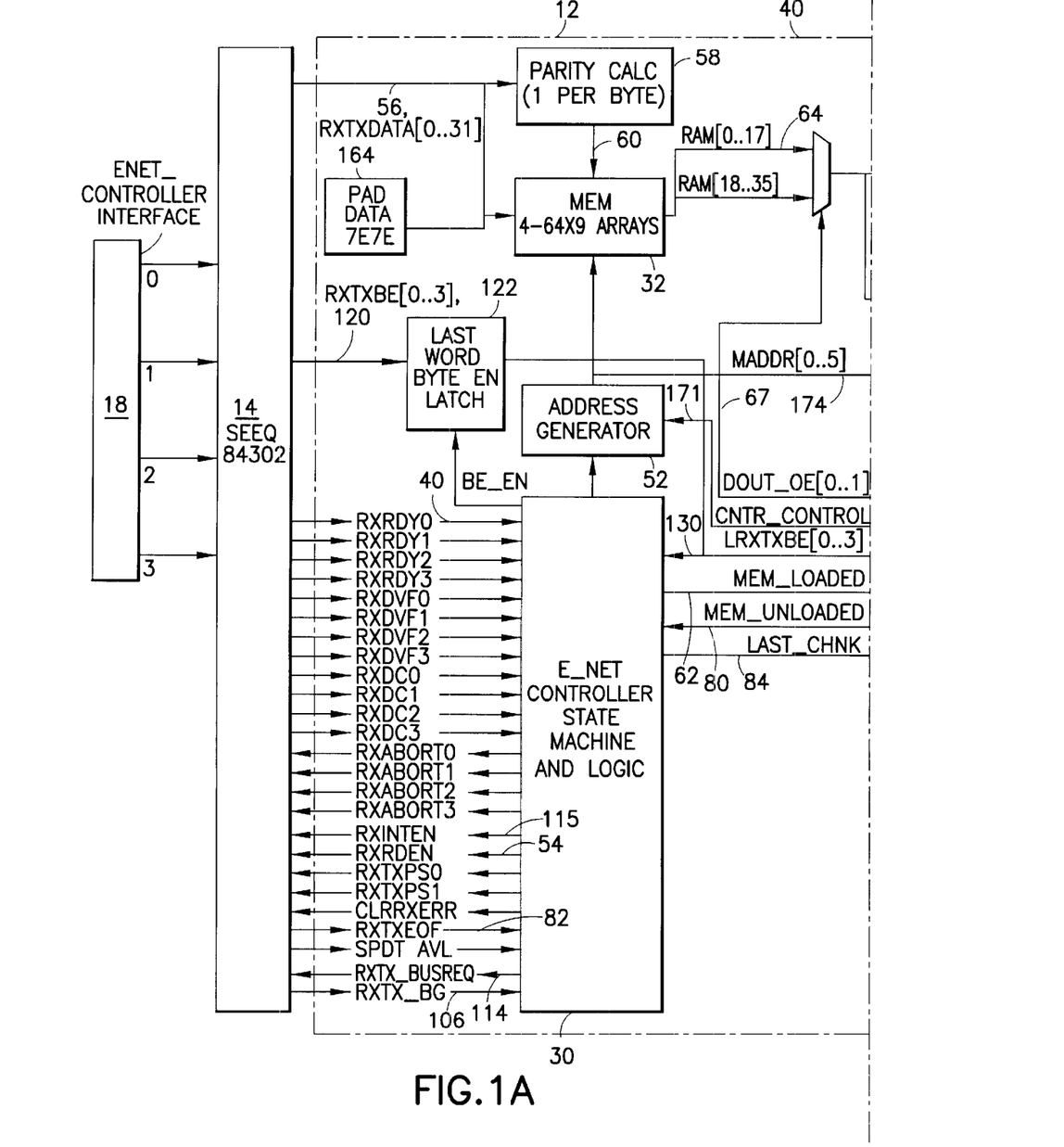

Turning now to FIG. 1, a high level block diagram of the bridging device 10 for mapping Ethernet data packets onto a SONET network is shown. The preferred bridging device 10 of the invention can map up to four 10/100 Mbps Ethernet channels onto an OC-12/OC-3 SONET network. The bridging device 10 utilizes a field programmable gate array (FPGA) or application specific integrated circuit (ASIC) 12 to provide a bridge between an Ethernet controller (Enet controller) 14 and a SONET framer 16 of a SONET interface 20. The Enet controller 14 is preferably a SEEQ 84302 Quad 10/100 Mbps chip set or equivalent which receives packet data from an Ethernet controller interface 18 and has a 32-bit bus operating at 50 MHz. The SONET framer 16 is preferably an IBM SMART device or the equivalent, and has a UTOPIA Level 2P interface with a 16-bit bus operating at 50 MHz. A microprocessor 22 is also coupled to the FPGA or ASIC 12.

When an FPGA 12 is utilized, the FPGA is preferably a medium size, such as the XILINX XC4013XLA-08PQ208C FPGA device having 208 pins, a 3.3 V core, and a 5 V tolerant input/output. Referring to Appendices 1 through 5 and FIG. 1, the FPGA 12 is programmed, preferably in VHDL code, to function as a number of software modules which create virtual components from the FPGA. The modules include an Ethernet controller interface module (Appendix 1) which implements an Ethernet state machine 30, a chunk memory implementation module (Appendix 2) which implements a chunk memory static RAM 32, a UTOPIA interface module (Appendix 3) which implements a UTOPIA state machine 34, a microprocessor interface module (Appendix 4) which implements an eight bit microprocessor interface 36 with the microprocessor 22, and an Fr-UTOPIA OUT module 38 (Appendix 5) which implements address and data bus drivers and control signals of the UTOPIA level 2 bus. The microprocessor 22 provides a 50 MHz timing signal 24 for both the Enet controller 14 and the SONET framer 16, and the microprocessor interface 36 has a clock stepped down to 25 MHz.

Figure 3:
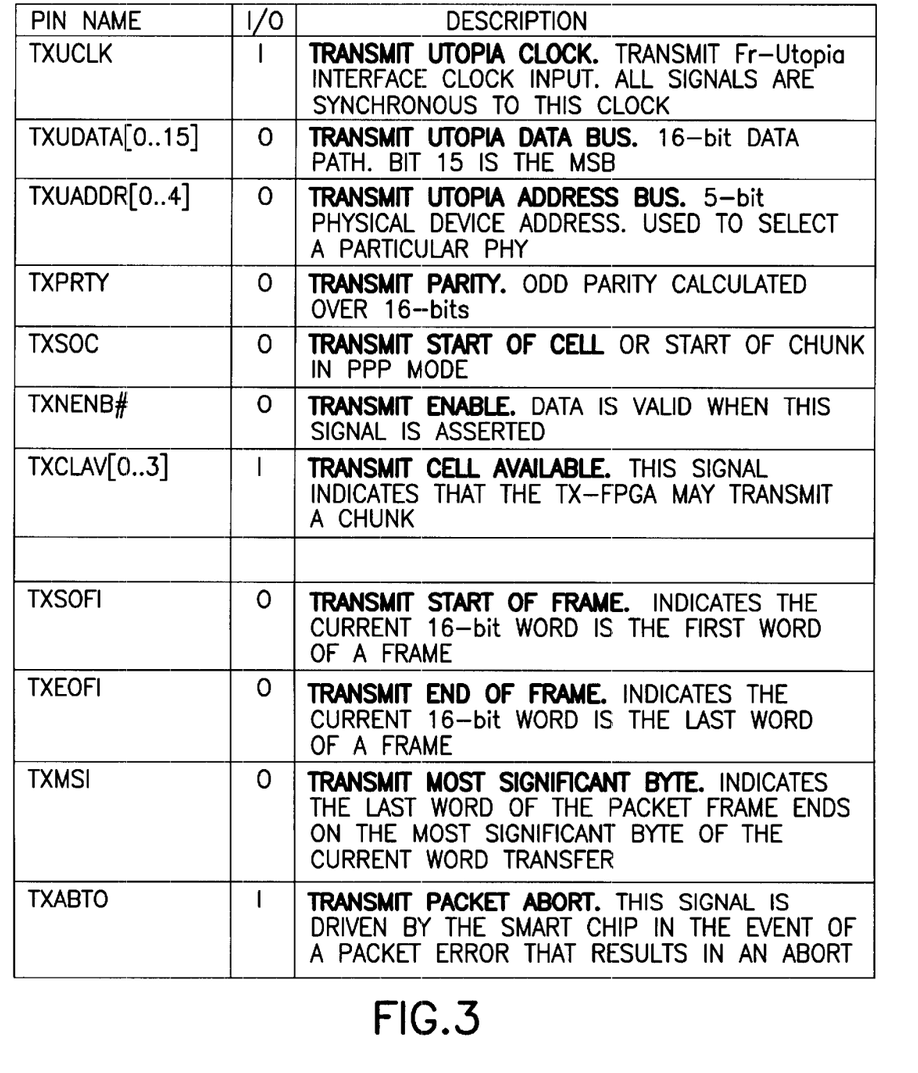
FIG. 3 is a table defining the transmit signalling/pin assignments of the pins of the UTOPIA state machine of the FPGA of the invention.
Figure 4:
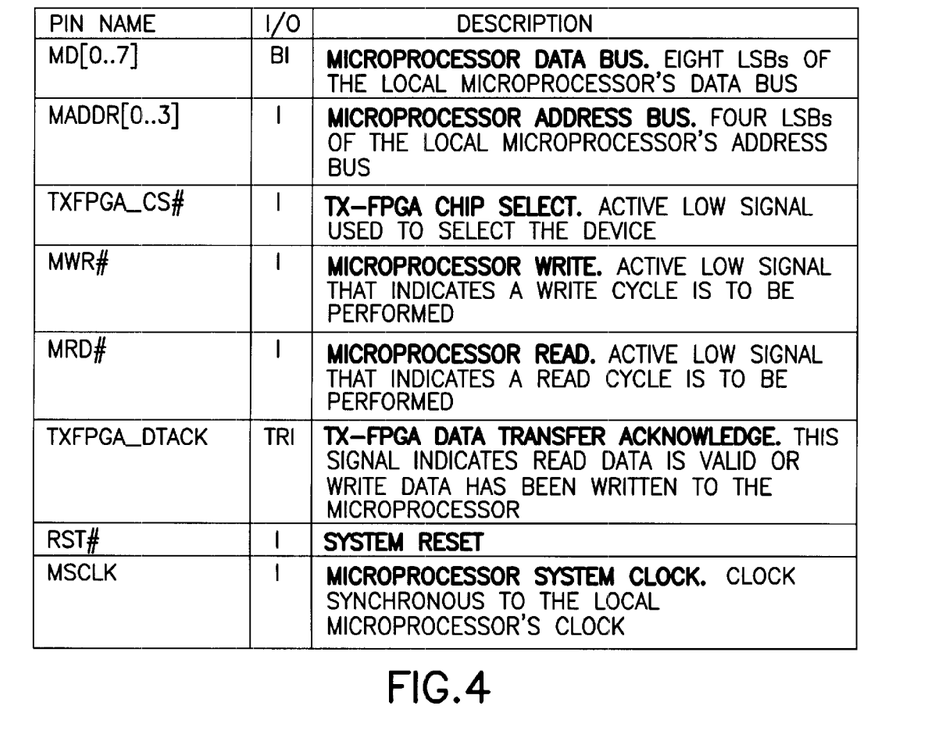
FIG. 4 is a table defining the transmit signalling/pin assignments of the pins of the microprocessor interface of the FPGA of the invention.
Figure 5:
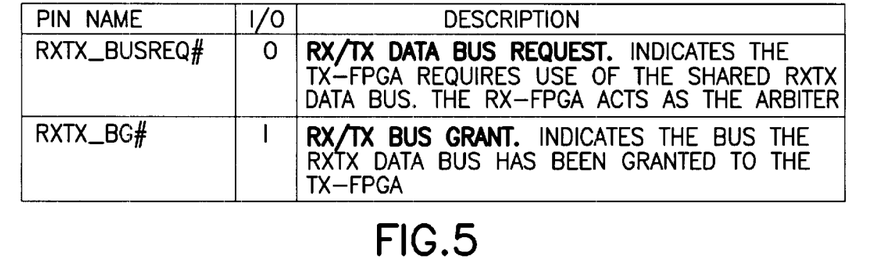
FIG. 5 is a table defining the transmit local arbitration signalling pin assignments of the FPGA of the bridging device of the invention.

A top level module 40 defines all external pins, internally used signals, and the above five modules 30–38, and instantiates the modules with proper interconnecting signals/pin assignments (Appendix 6). The signal/pin assignments for the Ethernet state machine 30 are described in detail in FIG. 2, the signal/pin assignments for the UTOPIA state machine 34 are described in detail in FIG. 3, the signal/pin assignments for the microprocessor interface 36 are described in detail in FIG. 4, and the local arbitration signal/pin assignments are described in detail in FIG. 5. From the above, it should be appreciated that all the block diagrams in the figures are functional representations of a preferred software implementation.

In general, referring back to FIG. 1, the FPGA, programmed to transmit (TX_FPGA), functions as follows. The Ethernet state machine 30 receives a receive ready RXRDY[0 . . . 3] signal 50 from the Enet controller 14 indicating that the FIFO of the controller 14 has data to be read from one of its four ports. The Ethernet state machine 30 directs an address generator 52 to generate an address in the memory 32 at which to locate incoming data and then responds with a receive read enable RXRDEN signal 54 to the Enet controller 14 that data is ready to be received. Data is then transferred from the FIFO across the RXTXDATA[0 . . . 31] data bus 56 thirty-two bits (four bytes) at a time. As the data is received, a parity calculation is performed by parity calculator 58 on each of the four incoming bytes, and the data and parity bits are written at 60 into memory 32 at the designated locations with each data byte accompanied by a parity bit. The address generator 52 then counts down to the next address at which to locate incoming data, and the process is repeated until the memory 32 is full or until there is no more data.

When the memory 32 is full, a memory loaded MEM_LOADED signal 62 is transmitted to the UTOPIA state machine 34 to pass control of the memory 32 to the UTOPIA state machine. The UTOPIA state machine 34 reads at 64 a first sixteen bit word from the memory 32 and performs a final parity calculation at 66 based on the two parity bits associated with the word while the data is held in the pipeline register 68. The sixteen bit word 70 along with a parity bit 72 are then transmitted to the SONET framer 16 along with an address 74 and a start of chunk TX_SOC signal 76. If the sixteen bit word is a start of frame, a start of frame TX_SOFI signal 78 is also transmitted to the SONET framer 16. Additional sixteen bit data words are read from the memory 32, final parities are calculated, and the data words and final parity bits are transmitted until the memory is emptied. When the memory 32 is emptied, the UTOPIA state machine 34 transmits a memory unloaded MEM_UNLOADED signal 80 back to the Ethernet state machine 30 and control reverts to the Ethernet state machine to read the next chunk data from the Ethernet controller FIFO.

The process of loading and unloading the data from chunk memory 32 repeats as set forth above until a last chunk of data from a frame in the FIFO of the Enet controller 14 is loaded into the memory, as indicated by an end of frame RXTXEOF signal 82 received from the Enet controller 14. After loading the last word, the MEM_LOADED signal 62 is sent by the Ethernet state machine to transfer control to the UTOPIA state machine, together with a LAST_CHUNK signal 84 to indicate that the data to be read is the last chunk of a frame. The UTOPIA state machine 34 then reads the data from the memory 32 and transmits the data and address, as described above. Upon transmission of the final word, the UTOPIA state machine transmits an end of frame TX_EOFI signal 86 to the SONET framer 16. The MEM_UNLOADED signal 80 is then transmitted back to the Ethernet state machine to place it in condition to accept the RXRDY[0 . . . 3] signal 40 from the Enet controller 14.

Figures 6, 6B:
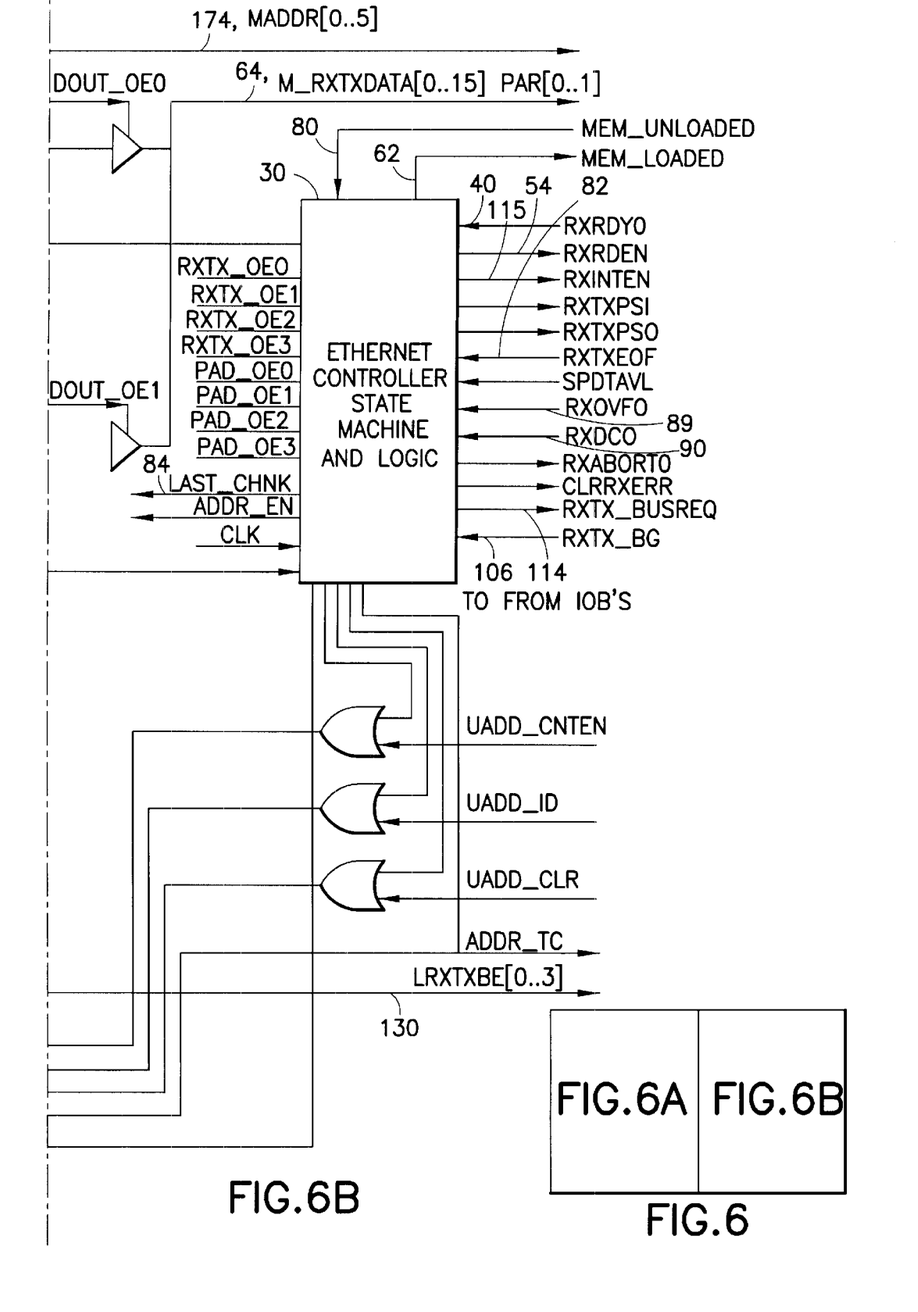
FIG. 6 is a detailed block diagram of the transmit side of the Ethernet state machine.
Figure 6A:
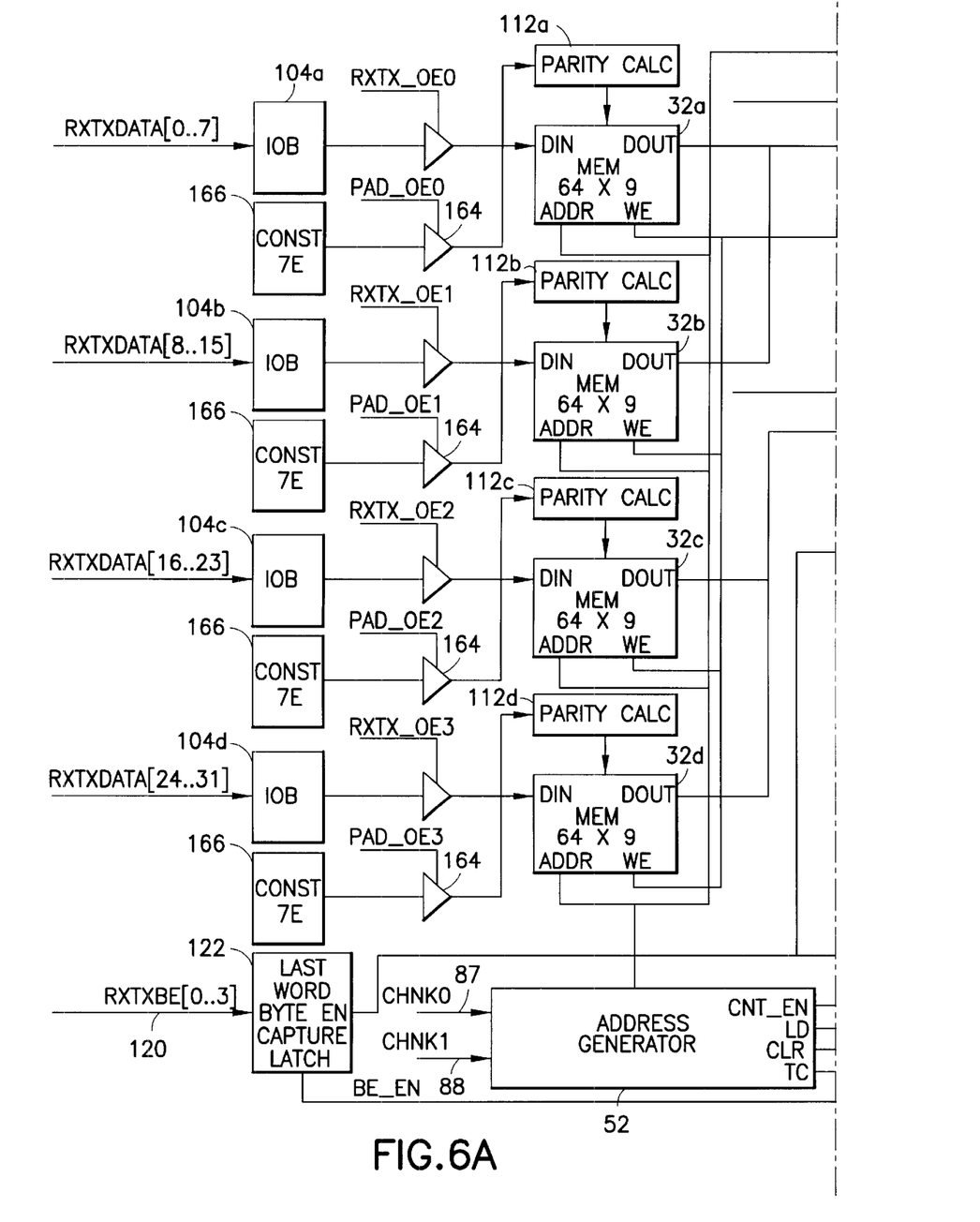
Figure 7:
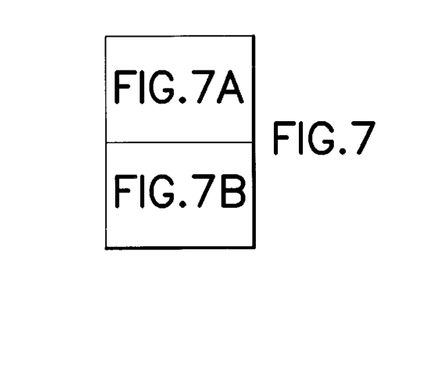
FIG. 7 is a partial transmit timing diagram of the FPGA of the invention.
Figure 7A:
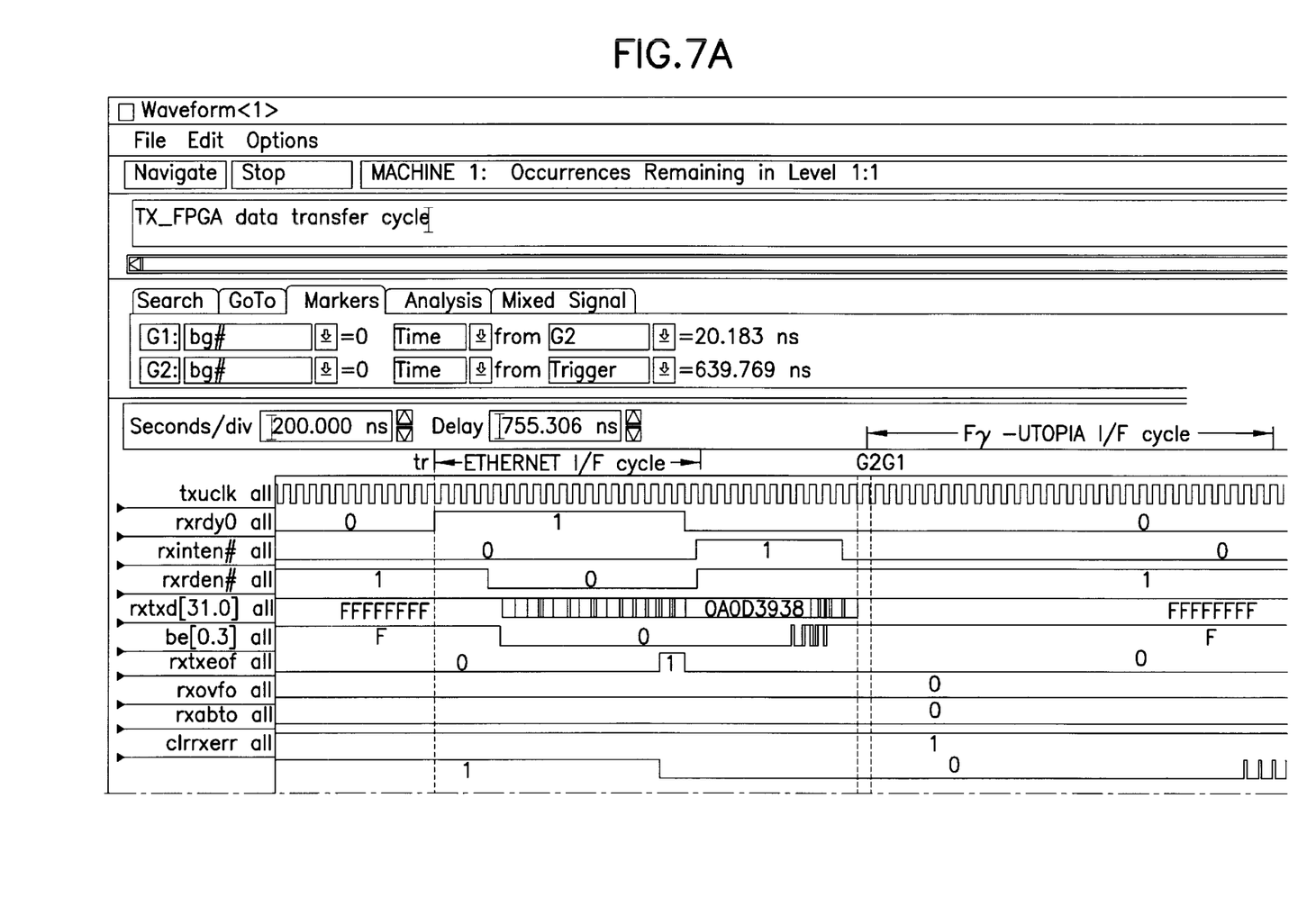
Figure 7B:
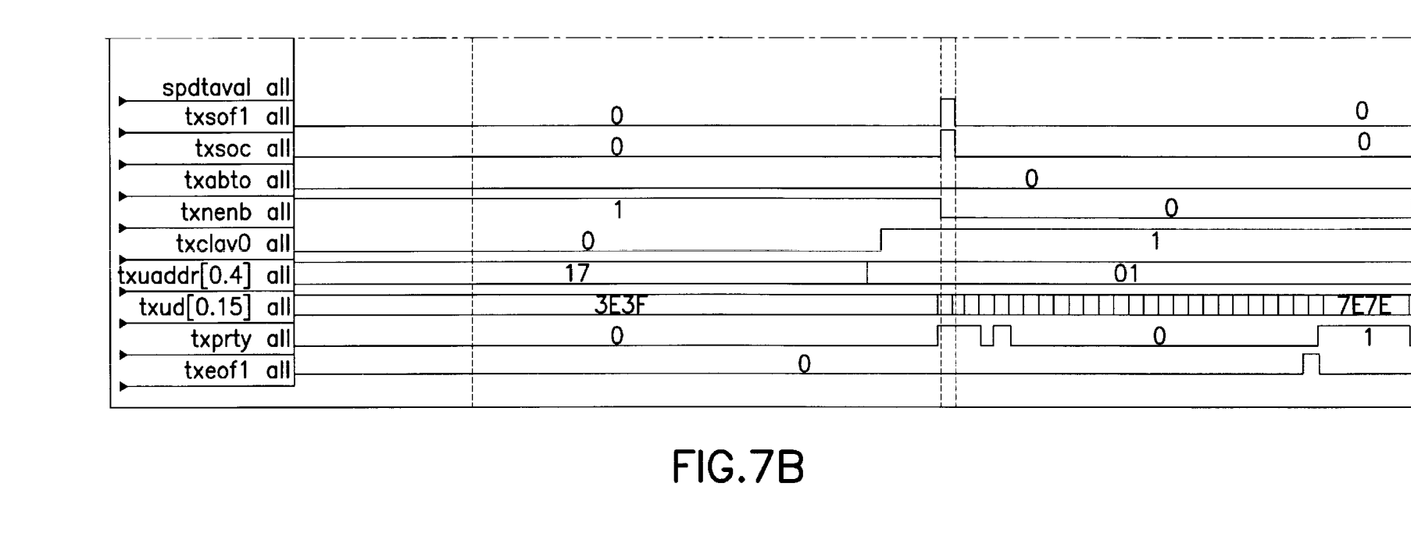
Figure 8:
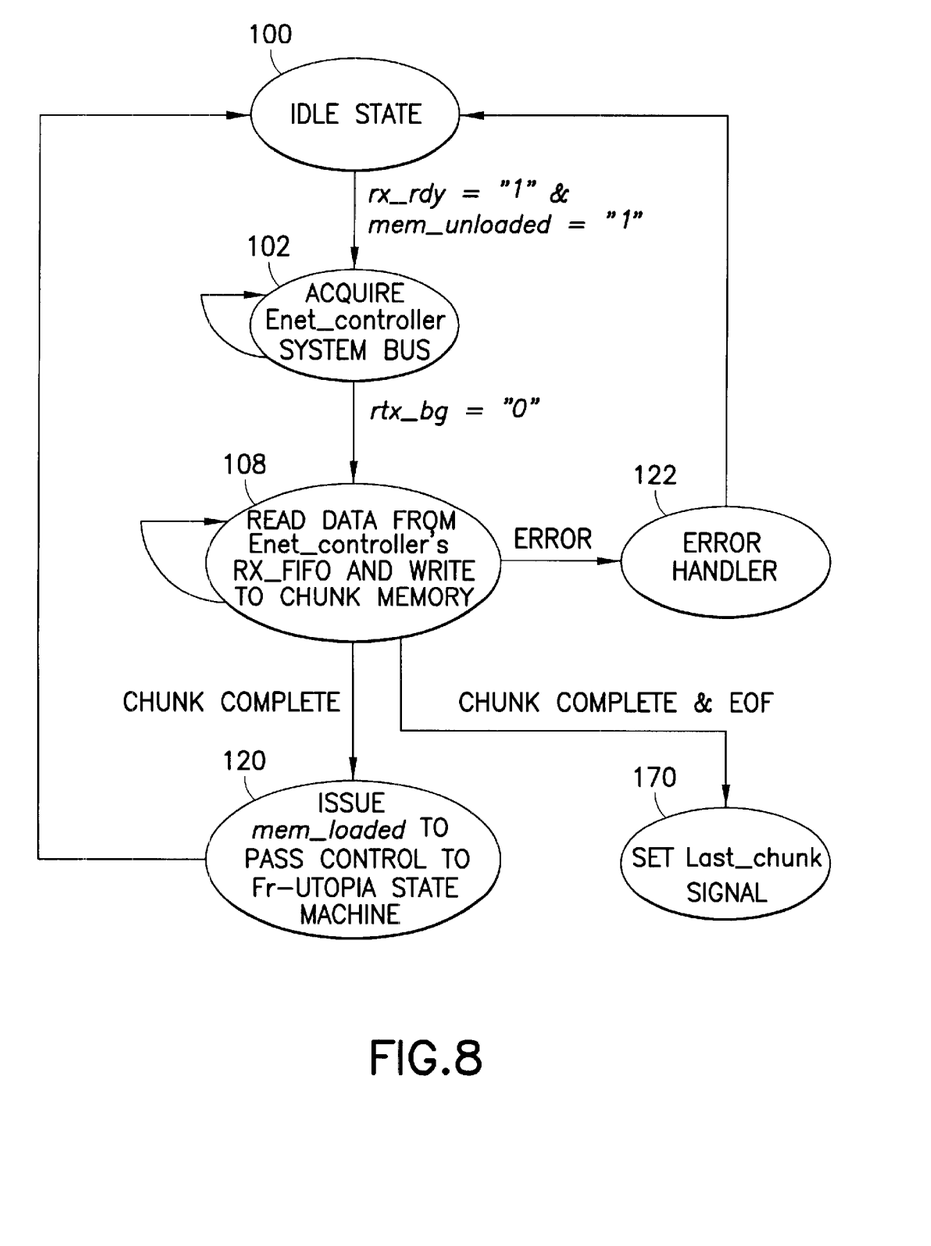
FIG. 8 is a high level transmit side flow chart of the Ethernet state machine of the invention.

The invention, will now be described in more detail with reference to FIGS. 6, 7 and 8. Referring first to FIG. 6, the Ethernet state machine 30 is shown which, for purposes of clarity, includes only the control signals required to implement one (the '0' signal) of the four Ethernet channels (0 . . . 3) the bridging device is capable of handling. The Ethernet state machine 30 is responsible for unloading the data received from the Enet controller 14 in a FIFO order, and then loading the data into the chunk memory RAM 32. The chunk memory RAM 32 can accommodate thirty-two, forty-eight, or sixty-four bytes of data, and can thereby support the chunk sizes used in a PPP mode of operation. The chunk size is set via a control register of the microprocessor interface 36. The microprocessor interface 36 uses a two-bit signal, CHNK0 87 and CHNK1 88 together, to define the chunk size.

Referring to FIGS. 1 and 6 through 8, the Ethernet state machine 30 starts at 100 from an idle state (with ready signal RXRDY="0" or low). Upon receiving a high FIFO ready RXRDY signal 40 (RXRDY="1") from the Enet controller 14 and a high memory unloaded MEM_UNLOADED signal 80 from the UTOPIA state machine 34, the FPGA 12 is set to acquire at 102 the Enet controller 14 system bus data RXTXDATA[0 . . . 31]. As the system interface bus on the Enet controller 14 is shared between transmit and receive functions, the Ethernet state machine 30 must also request use of the RXTXDATA bus 56 prior to beginning data transfer. Use is requested by asserting a bus request RXTX_BUSREQ signal 114 to the receive FPGA (RXF_FPGA, for receiving data from the SONET framer 16 and sending the data to the Enet controller 14), discussed below, and waiting for the bus grant RXTX_BG signal 106 to be returned by the RX_FPGA. When the receive functions are not being utilized, the RXTXDATA bus 56 ensures that the RXTX_BG signal 106 is available.

Upon receiving the RXTX_BG bus grant signal 106, the Ethernet state machine 30 directs the address generator 52 to generate an address in the memory 32 at which to locate incoming data. When the bus grant RXTX_BG signal 106 is low, the FPGA begins reading the FIFO of the Enet controller 14 at 108 by asserting a FIFO read enable RXRDEN signal 54 low. The RXRDEN signal 54 is asserted low for sixteen clocks which permits sixty-four bytes from the RXTXDATA system data bus, in four bytes 104a, 104b, 104c, 104d, to be read from the FIFO and written into the chunk memory static RAM 32a, 32b, 32c, 32d at the location indicated by the address generator 52. That is, on each of the sixteen clocks after the RXRDEN signal 54 is asserted, thirty-two bits (four bytes) of data are presented to the RXTXDATA pins. Parity for each byte is calculated at 112a, 112b, 112c, 112d and is stored in memory along with the associated data byte. After sixteen clocks, the RXRDEN signal 54 and a RXINTEN interface enable signal 115 are asserted high. Each time the data is loaded into the memory 32, the address generator 52 counts down to the next address at which to locate incoming data. With the Enet controller 14 running at 50 MHz, approximately 320 ns (16×20 ns) are required to load the chunk memory 32.

When the address generator 52 has counted down to zero, the chunk memory 32 is fully loaded and control is passed to the UTOPIA state machine 34. The memory loaded MEM_LOADED signal 62 is then issued at 120 (FIG. 8) to the UTOPIA state machine 34 informing the UTOPIA state machine that the memory 32 is available for reading; i.e., that control is passed to the UTOPIA state machine 34. If at any point prior to passing control to the UTOPIA state machine an error occurs, as indicated by FIFO overflow signal RXOVF[0] 88 and FIFO data discard signal RXDC[0] 90, an error handler 122 in the Ethernet state machine 30 returns the Ethernet state machine 30 to the idle state 100.

Figure 9:
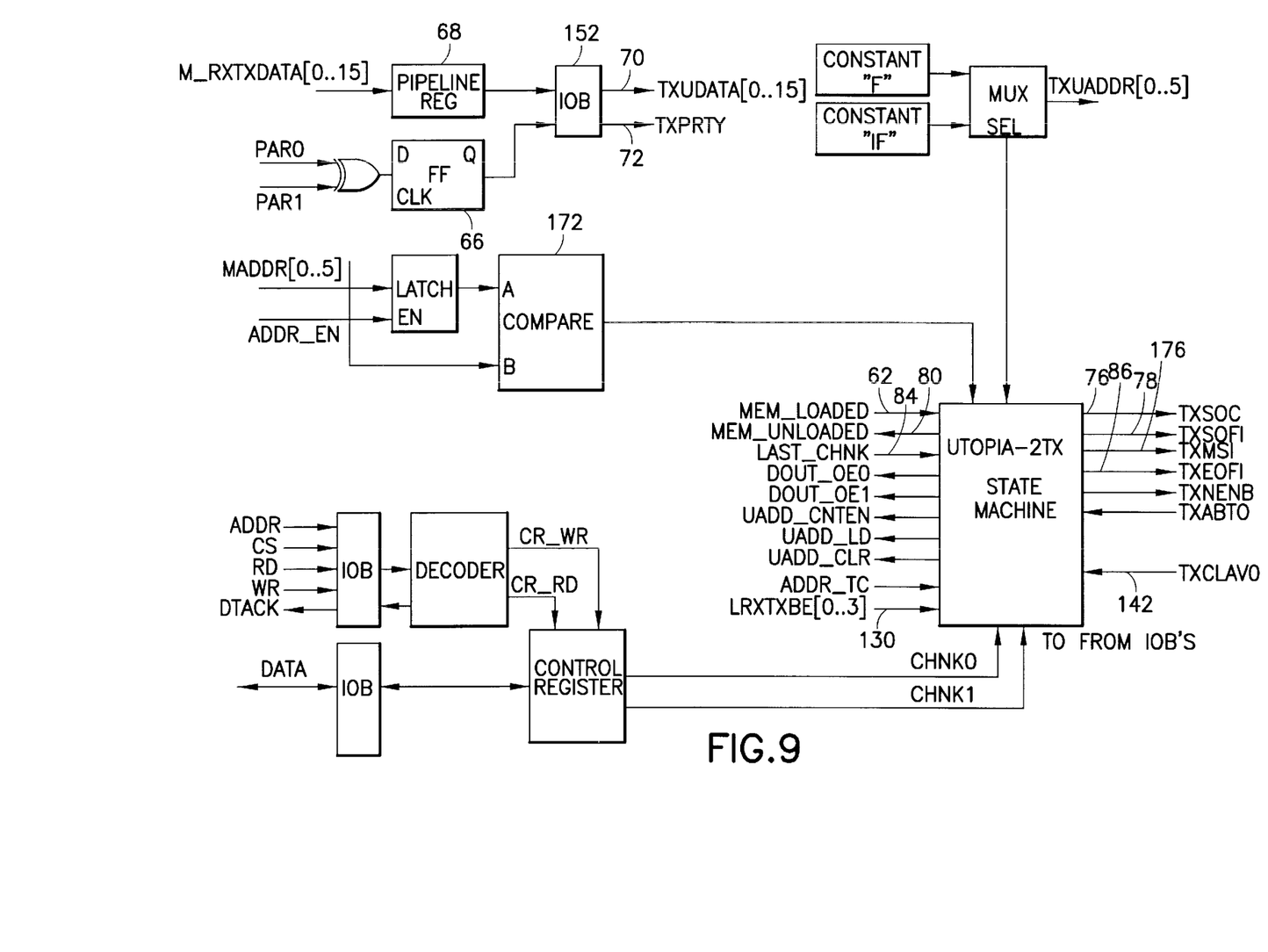
FIG. 9 is a detailed block diagram of the transmit side of the Fr-UTOPIA (Utopia Level 2P) interface of the invention.
Figure 10:
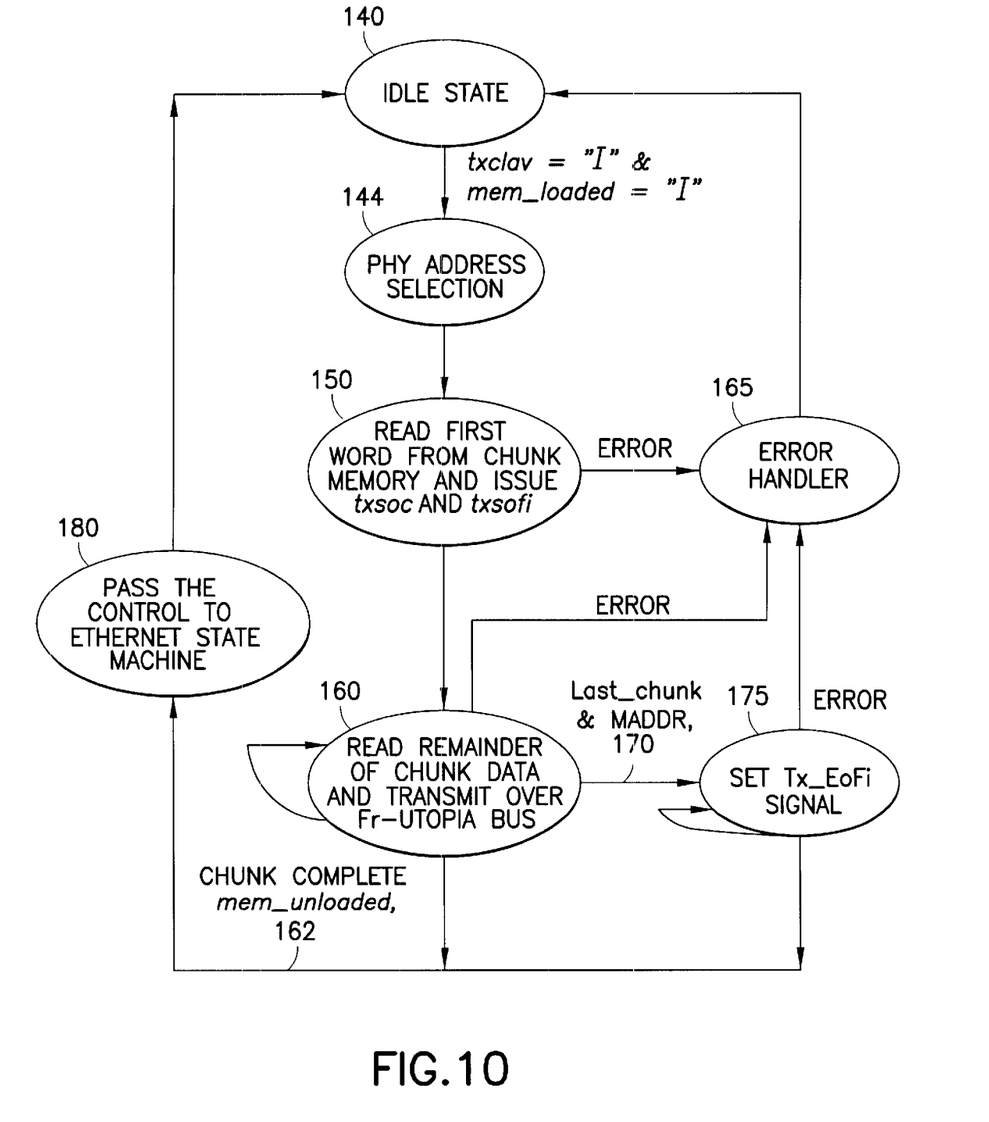
FIG. 10 is a high level transmit side flow chart of the UTOPIA state machine of the invention.

Turning now to FIGS. 9 and 10 (in conjunction with FIG. 1), when the UTOPIA state machine 34 is signalled to change from an idle state at 140 to its control state by the MEM_LOADED signal 62 and a high transmit cell available TXCLAV[0] signal 142 (received from the SONET framer 16), the UTOPIA state machine selects a PHY (a macro) address at 144 from inside the SONET framer 16 by using a physical (PHY) address register 146 which is regularly polling the SONET framer 16. This is accomplished according to the Utopia Level 2 protocol, published as Utopia Level 2, Version 1, by the ATM forum in June, 1995, which is hereby incorporated by reference herein in its entirety. One of four macros can be selected at any given time for transfer of data. The macros provide the data into SONET frame format and add the necessary overhead bytes to from a complete SONET frame.

The UTOPIA state machine 34 then unloads the chunk memory 32 and transfers the data sixteen bits at a time to the SONET framer 16 over the Fr-UTOPIA bus. The data is read out of the memory 32 thirty-two bits at a time (as directed by DOUT_OE[0 . . . 1 ] 67), as upper and lower sixteen bit words. The upper word is transferred to the input/output register 152, while the lower word is held in the pipeline register 68. A final parity is performed at 66 on the two parity bits associated with upper word, and then the upper word and its final parity bit is transferred to the SONET framer 16. The first word is sent along with the address TXUADDR[0] 74 and the start of chunk TX_SOC signal 76. In addition, if the first sixteen bit word is a start of frame, a start of frame TX_SOFI signal 78 is also transmitted to the SONET framer 16. Then, the lower word is transferred to the input/output register 152 while a final parity is performed on its two parity bits. The lower word and its final parity bit are then transferred to the SONET framer 16. The upper and lower words are transferred to the SONET framer on alternate cycles of the 50 MHz Fr-UTOPIA clock, signalled by the transmit Utopia clock TX_UCLK signal 154.

Additional sixteen bit data words are read from the memory 32, final parities are calculated, and the data words and final parity bits are transmitted at 160 until the memory is emptied. When the memory 32 is emptied, the UTOPIA state machine 34 transmits at 162 the MEM_UNLOADED signal 80 back to the Ethernet state machine 30 and control reverts to the Ethernet state machine 30 to read the next data from the Ethernet controller FIFO and place the data into the memory. If at any point prior to passing control to the Ethernet interface 30 an error occurs, an error handler 165 returns the UTOPIA state machine 34 to the idle state 140.

The process of control being switched back and forth between the Ethernet state machine 30 and the UTOPIA state machine repeats until the last chunk in a frame is sent by the FIFO to the Ethernet state machine. The data is read and provided into memory and, if necessary, the unused portion of the memory is filled at 164 with the proper amount of padding data 166 (FIG. 6). The last chunk in a frame is indicated by an end of frame RXTXEOF signal 82 which is generated by the Enet controller 14. In turn, when control is passed from the Ethernet state machine 30 to the UTOPIA state machine 34 for unloading the last chunk of data from the memory 32, the last chunk LAST_CHNK signal 84 is sent from the Ethernet state machine 30 to the UTOPIA state machine set at 170 and a counter control CNTR_CONTROL signal 171 is sent to stop the address generator counter 52. In addition, a comparator 172 is activated and identifies the address MADDR[0 . . . 5] 174 at which the last data word is stored, and the address is sent to the UTOPIA state machine. This address was latched at 122 by the Ethernet state machine 30. The last chunk is read from memory just like any other chunk with the exception that when the last longword is read, the stored latched bytes enabled LRXTX_BE[0] signal 130 allows the UTOPIA state machine 34 to assert at 175 the transmit end of file TX_EOFI signal 86 and the most significant byte TX_MSI signal 176 (to indicate where in the transferred chunk the last word is located).

When the last sixteen bit word of a chunk of a frame is transferred over the UTOPIA state machine 34 to the SONET framer 16, the MEM_UNLOADED signal 80 is set at 162 and control is given back at 180 to the Ethernet interface 30 so that the next chunk of the next frame can be read from the FIFO of the Enet controller 14. Since the previous chunk was the last chunk of a frame, the UTOPIA interface 34 also clears the LAST_CHNK signal 84 and indicates to the SONET framer 16 that the next chunk to be transmitted is a first chunk of a frame by asserting the TX_SOC signal 76 and TX_SOFI signal 78. The relationship and function of the above described signals may be better understood with reference to the timing diagram of FIG. 7.

The above description pertains to the transmit functions of the bridging device; i.e., the mapping of Ethernet packet data to a SONET network. The bridging device 10 is also adapted to operate in the opposite direction to map data from a SONET network into Ethernet data packets (i.e., 'demap') for transmission over an Ethernet channel. For demapping or receive functions, a second FPGA (RX_FPGA) is provided which includes a second top level module (Appendix 11) which instantiates an Ethernet controller interface module which implements an Ethernet state machine (Appendix 7), a chunk memory implementation module which implements a chunk memory static RAM (Appendix 8), a UTOPIA interface module which implements a UTOPIA state machine (Appendix 9), a microprocessor interface module which implements a microprocessor interface (Appendix 10), each of which are substantially as described above with respect to the TX_FPGA 12. The demapping implementation operates substantially in reverse of the mapping implementation with the following exceptions. First, the mapping FPGA (TX_FPGA) is interfaced to the transmit UTOPIA (TX_UTOPIA) bus of the SONET framer, whereas the demapping FPGA (RX_FPGA) is interfaced to the receive UTOPIA (RX_UTOPIA) bus of the SONET framer. Both of the TX_FPGA and RX_FPGA share a common bus on the Enet controller side, as discussed above. Second, as the Enet controller does not require data padding, padding data received from the SONET framer is stripped and discarded. Third, parity is calculated on the data coming from the SONET framer prior to assigning the data to the chunk memory. Fourth, in the mapping FPGA, the Ethernet state machine triggers the UTOPIA state machine, whereas in the demapping device UTOPIA state machine triggers the Ethernet state machine.

The bridging device 10 of the invention permits Ethernet data packets to be mapped onto a SONET network and SONET network data to be demapped into Ethernet packets in an efficient manner.

There have been described and illustrated herein a bridging device for bridging Ethernet channels to a SONET network. While particular embodiments of the invention have been described, it is not intended that the invention be limited thereto, as it is intended that the invention be as broad in scope as the art will allow and that the specification be read likewise. Thus, while an FPGA has been disclosed for implementing the bridging device, it will be appreciated that an application specific integrated circuit (ASIC) may be used as well. In addition, while it has been stated that particular Ethernet channels can be mapped to particular SONET networks, it will be appreciated that other Ethernet bandwidths can be mapped/demapped to other bandwidth SONET networks. For example, the bridging device can map/demap a gigabit Ethernet channel onto an OC-48 network with minor modifications. In addition, where the term SONET is used, it will be appreciated that SONET is also meant to refer to Synchronous Digital Hierarchy (SDH), the European equivalent to SONET. Also, while particular VBDL software code has been described for the implementation of the invention, it will be recognized that other programming languages may be used to implement the FPGA, and the other software code in VHDL may likewise be used. Furthermore, while two separate FPGAs (TX_FPGA and RX_FPGA) have been described to implement the bridging device, it will be appreciated that a single relatively larger FPGA may be utilized which includes the code for both the TX_FPGA and RX_FPGA functions. It will therefore be appreciated by those skilled in the art that yet other modifications could be made to the provided invention without deviating from its spirit and scope as claimed.

What is claimed is:

1. A bridging device for mapping and demapping data from Ethernet channel to and from a SONET network, said bridging device comprising:
   a) an Ethernet controller chip set coupled to the Ethernet channel;
   b) a SONET framer coupled to the SONET network; and
   c) one of an FPGA and an ASIC programmed to directly map data between said Ethernet controller chip set and said SONET framer.

2. A bridging device according to claim 1, wherein:
said one of said FPGA and said ASIC is programmed in VHDL language.

3. A bridging device according to claim 1, wherein:
said one of said FPGA and said ASIC reads data from said Ethernet controller chip set 32 bits at a time and transmits data to said SONET framer 16 bits at a time.

4. A bridging device according to claim 1, wherein:
said one of said FPGA and said ASIC includes,
i) a memory,
ii) a loading means for loading said memory with 8-bit bytes of data and an associated parity bit, and
iii) a retrieving means for retrieving data as sixteen bit words with two parity bits.

5. A bridging device according to claim 4, wherein:
said one of said FPGA and said ASIC includes,
iv) means for generating said associated parity bit.

6. A bridging device according to claim 4, wherein:
said one of said FPGA and said ASIC includes,
iv) means for taking two of said parity bits and generating a final parity bit for each of said sixteen bit words.

7. A bridging device according to claim 1, wherein:
said one of said FPGA and said ASIC directly demaps data from said SONET framer to said Ethernet controller chip set.

8. A bridging device according to claim 1, further comprising:
d) a second one of an FPGA and an ASIC which directly demaps data from said SONET framer to said Ethernet controller chip set.

9. An FPGA or an ASIC for mapping data of a data frame between an Ethernet controller chip set coupled to an Ethernet channel and a SONET framer coupled to a SONET network, said FPGA or ASIC comprising:
  a) a memory;
  b) an Ethernet controller interface logic means coupled to the Ethernet controller chip set and to said memory for reading data 32 bits at a time from the Ethernet controller chip set and loading said data into said memory; and
  c) a UTOPIA interface logic means coupled to said memory and to the SONET framer for unloading the data in sixteen bit words and transferring the data to the SONET framer.

10. An FPGA or an ASIC according to claim 9, wherein:
  said Ethernet controller interface logic means sends a first signal to said UTOPIA interface logic means when said memory is loaded with data, and said UTOPIA interface logic means sends a second signal to said Ethernet controller interface logic means when said data is unloaded from said memory.

11. An FPGA or an ASIC according to claim 9, further comprising:
  d) means for generating a first parity bit for each of four bytes of said 32 bits of data; and
  e) means for calculating a second parity bit from a plurality of said first parity bits,
  said UTOPIA interface logic means transferring said sixteen bit words along with an associated said second parity bit.

12. An FPGA or an ASIC according to claim 9, further comprising:
  d) means for generating an address in said memory at which to load said 32 bits of data.

13. An FPGA or an ASIC according to claim 9, wherein:
  said Ethernet: controller interface logic means sends a last chunk signal to said UTOPIA interface logic means when a last 32 bits of the frame are read, and
  said UTOPIA interface logic means sends an end of frame signal to the SONET framer when said first signal is received by said UTOPIA interface logic means.

14. An FPGA or an ASIC for mapping data of a data frame from a SONET framer coupled to a SONET network to an Ethernet controller chip set coupled to an Ethernet channel, said FPGA or ASIC comprising:
  a) a memory;
  b) a UTOPIA interface logic means coupled to said memory and to the SONET framer for unloading the data from the SONET framer in sixteen bit words and transferring the data to said memory; and
  c) an Ethernet controller interface logic means coupled to the Ethernet controller chip set and to said memory for reading data 32 bits at a time from said memory and transferring the data to the Ethernet controller chip set.

15. A method of mapping Ethernet data packets from a Ethernet channel to a SONET network, said method comprising:
  a) reading data from a FIFO of an Ethernet controller four bytes at a time;
  b) writing each of said bytes in a memory; and
  c) transferring said data from said memory to a SONET framer over a UTOPIA bus sixteen bits at a time.

16. A method according to claim 15, further comprising:
  d) for each of said bytes, calculating a first parity bit;
  e) storing said first parity bit with its associated byte in said memory; and
  f) for each of a plurality of bytes, calculating a second parity bit from a plurality of said first parity bits, wherein
  said transferring includes transferring said second parity bit along with said data to said SONET framer.

17. A method according to claim 15, wherein:
  said reading, said writing, and said transferring are performed by one of a field programmable gate array and an application specific integrated circuit.

18. A method according to claim 15, wherein:
  said reading, said writing, said transferring, said calculating said first parity bit, said storing, and said calculating said second parity bit are performed by one of a field programmable gate array and an application specific integrated circuit.

19. A method of mapping SONET data from a SONET framer onto an Ethernet channel, said method comprising:
  a) reading data from a FIFO of the Ethernet framer 16 bits at a time;
  b) writing said 16 bits in a memory; and
  c) transferring said data from said memory over a data bus 32 bits at a time to an Ethernet controller coupled to the Ethernet channel.

20. A method according to claim 19, wherein:
  said reading, said writing, and said transferring are performed by one of a field programmable gate array and an application specific integrated circuit.

* * * * *